July 7, 1959 D. C. DICKSON, JR 2,893,904

THERMAL ZENER DEVICE OR THE LIKE

Filed Oct. 27, 1958

INVENTOR.
DONALD C. DICKSON, JR
BY
ATTORNEY

United States Patent Office 2,893,904
Patented July 7, 1959

2,893,904

THERMAL ZENER DEVICE OR THE LIKE

Donald C. Dickson, Jr., Phoenix, Ariz., assignor to Hoffman Electronics, a corporation of California Application October 27, 1958, Serial No. 769,637

10 Claims. (Cl. 148—33)

The present invention relates to a thermal Zener device and, more particularly, relates to a particular configuration for a Zener device whereby such a device will not only create thermal effects in response to certain circuit conditions but will also be responsive to such thermal effects for performing desired circuit functions.

According to the present invention, a wafer of semiconductor material having a p-n junction is provided with a normally thick portion and a relatively thin portion. Electrical contacts are made to the thick portion by means of metallic elements, either or both of which also serve as heat sinks. The thin portion is either surrounded by material having high thermal resistance or else otherwise disassociated from means which might serve to remove heat from the thin portion. In normal operation in the reverse direction, the usual rectifying action will take place until the Zener breakdown voltage is reached and the device will present a voltage at the Zener voltage level. However, upon the occurrence of a high voltage or current surge in that reverse direction, thermal breakdown will occur in the thin portion because the bulk resistance of the device in the thick portion will tend to shunt current to the thin portion, and the thin portion, not being provided with means for dissipating or otherwise removing the heat, will increase in temperature to the thermal breakdown level. Since the voltage level corresponding to thermal breakdown is substantially lower than the Zener voltage level, the reverse voltage output level of the device will be reduced substantially. Thus, the device may operate as a short-circuit switch for either protection or actuation of a load circuit upon occurrence of a surge or pulse of high voltage and/or current in the reverse direction.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a perspective view of a device in accordance with the present invention.

Figures 1, 2, 3:
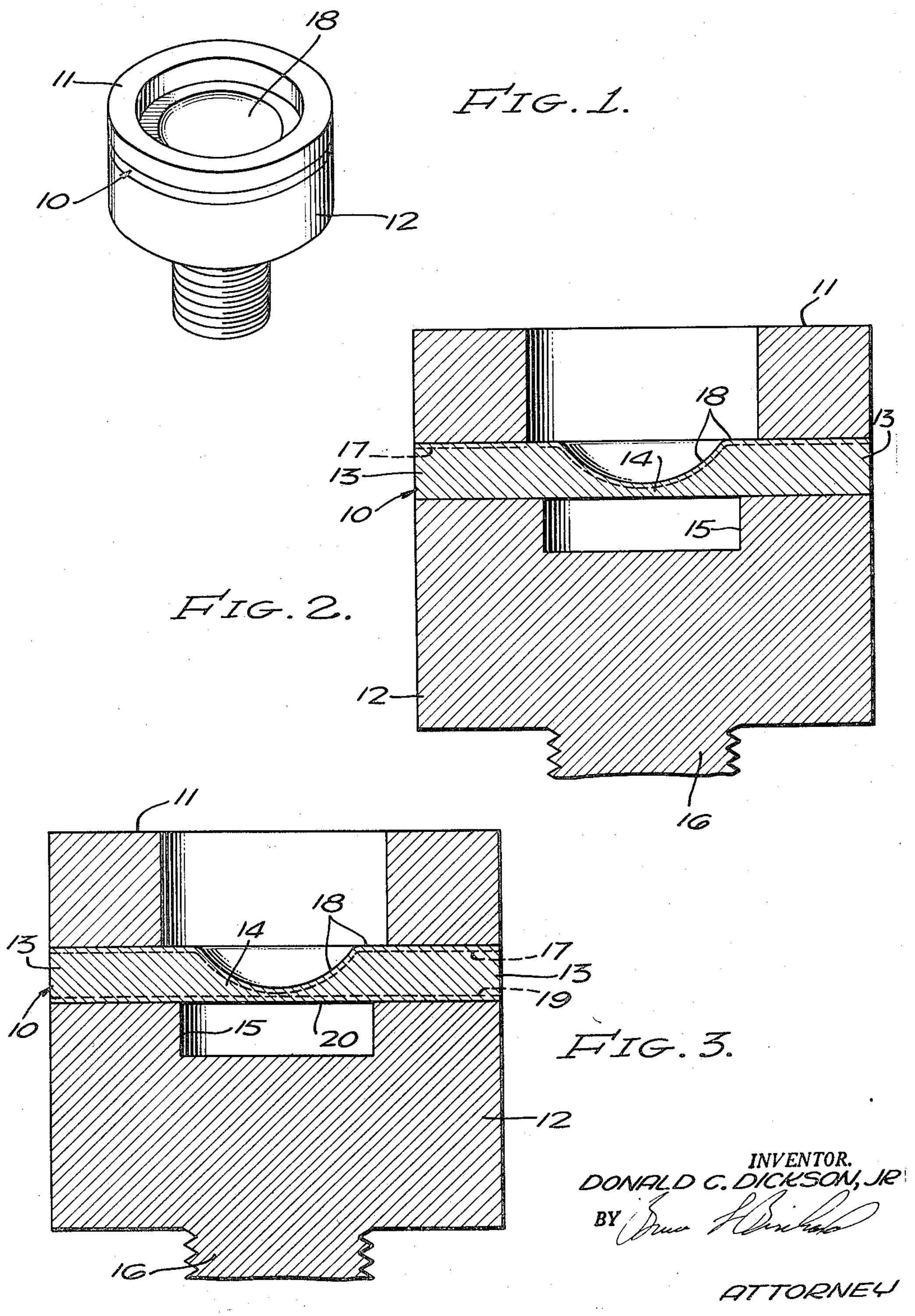
Figure 2 is a sectional elevational view of the device of Figure 1, diagrammatically indicating one p-n junction therein.
Figure 3 is a sectional elevational view of the device of Figure 1, diagrammatically indicating two p-n junctions therein.

As shown in the figures, a wafer 10 of semiconductor material is provided with both an upper metallic ring 11 and a lower metallic base member 12 in both mechanical and electrical contact therewith. Wafer 10 constitutes a slice from a single crystal semiconductor body and is provided with a thick peripheral portion 13 which completely encircles a thin central portion 14. Ring 11 does not come in contact with the upper surface of thin portion 14 but is only in contact with the upper surface of thick portion 13. Base member 12 is provided with an annular upper portion 15 so that it, too, does not come in contact with thin portion 14 but only with the bottom surface of thick portion 13. Base member 12 is provided with a threaded mounting bolt portion 16 so that the entire device may be secured to an electrical chassis (not shown) for additional heat dissipation as well as electrical connection. Wafer 10 is provided with a p-n junction 17 which extends over the entire wafer beneath the upper non-planar surface 18 thereof.

Figure 3 shows a device identical to that of Figure 2 with the exception of one detail thereof; therefore, the same indicating numerals have been applied thereto. A second p-n junction 19 is disposed over the extent of wafer 10 near the lower surface 20 thereof. Thus, the semiconductor material between junctions 17 and 19 will be of one conductivity type, and the semiconductor material on the surfaces 18 and 20 of wafer 10 will be of a different conductivity type. Either a P–N–P or an N–P–N structure is suitable.

When operating in the reverse direction under normal values of voltage and current, the device will operate in the same manner as the usual Zener diode. However, upon the occurrence of a voltage or current surge in that reverse direction, the wafer will heat rapidly in the thin central portion 14 until the thermal breakdown level is reached, whereupon the rectifying effect will be practically eliminated and the reverse voltage will be reduced far below the original Zener operating level. The heating effect in the thin portion 14 is enhanced by two principal factors, namely, the bulk resistance of the thick portion 13 of wafer 10 will tend to shunt current to the thin portion 14, and the thin portion 14, not being in contact with ring 11 and base member 12, is disassociated from any heat sink. Upper ring 11 and/or lower member 12 serve as heat sinks for dissipation of any heat generated in the wafer 10 during normal operation thereof, thus preventing thermal breakdown during such normal operation, but are unable to dissipate the heat rapidly enough during sudden surges of voltage or current.

The sudden decrease in voltage drop across the device may be utilized in many ways, for example, switching or triggering.

In a preferred embodiment of the device, the wafer 10 consists of a slice of silicon of one conductivity type which is cut deeply in the center to form the thin portion 14. The cut is obtained preferably by an etching process with an acid jet, rather than a grinding process, to prevent either breakage or the occurrence of sharp corners. Then the p-n junction is formed preferably by a diffusion process because of the fact that, once the junction is formed, the rate of diffusion of the junction forming impurities is extremely low even at temperatures as high as 500° C., thus assuring a life of the device of many thousands of hours without a substantial change of distribution of the junction forming impurities. Hence, the Zener level and the thermal breakdown level would remain substantially constant.

The ring 11 and the base member 12 may be made of any electrically conductive material which also has a coefficient of thermal conductivity that is relatively high with respect to the semiconductor material. Suggested materials may be molybdenum and copper.

The thin portion 14 may be formed by a depression on one surface only, as shown, or may be formed on both surfaces to leave a thin portion between the depressions. The thickness of the thin portion is preferably in the order of 0.001 inch to assure good operating and thermal breakdown characteristics. A range of 0.005 inch to 0.0005 inch should cover a wide range of dissipation levels.

Although the preferred acid jet process of forming the depression naturally creates a somewhat hemispherical depression, other shapes can be used as long as care is exercised to assure a continuous p-n junction.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A semiconductor device including: a wafer of semiconductor material having a thick portion, a relatively thin portion integral therewith, said thick and thin portions having a continuous upper surface and a continuous lower surface, and at least one p-n junction disposed in said material between said upper and lower surfaces substantially over the extent of said wafer; and first and second contact means in electrical and mechanical connection to only said thick portion at said upper and lower surfaces, respectively, at least one of said contact means having high thermal conductivity relative to said semiconductor material to constitute a heat sink for said thick portion.

2. A semiconductor device including: a wafer of semiconductor material having a thick peripheral portion, a relatively thin central portion surrounded by and integral with said thick portion, said thick and thin portions having a continuous upper surface and a continuous lower surface, and at least one p-n junction disposed in said material between said upper and lower surfaces substantially over the extent of said wafer; and first and second contact means in electrical and mechanical connection to only said thick portion at said upper and lower surfaces, respectively, at least one of said contact means having high thermal conductivity relative to said semiconductor material to constitute a heat sink for said thick portion.

3. A semiconductor device including: a wafer of semiconductor material having a thick peripheral portion, a relatively thin central portion surrounded by and integral with said thick portion, said thick and thin portions having a continuous upper surface and a continuous lower surface, and at least one p-n junction disposed in said material between said upper and lower surfaces substantially over the extent of said wafer; a ring in electrical and mechanical connection to only said thick portion at said upper surface; and a metallic base member provided with an annular upper portion in electrical and mechanical connection to only said thick portion at said lower surface, said base member being composed of material having high thermal conductivity relative to said semiconductor material to constitute said base member a heat sink for said thick portion.

4. A semiconductor device including: a wafer of semiconductor material having a thick peripheral portion, a relatively thin central portion surrounded by and integral with said thick portion, said thick and thin portions having a continuous upper surface and a continuous lower surface, and at least one p-n junction disposed in said material between said upper and lower surfaces substantially over the extent of said wafer; a ring in electrical and mechanical connection to only said thick portion at said upper surface; and a metallic base member provided with an annular upper portion in electrical and mechanical connection to only said thick portion at said lower surface, said base member and said ring being composed of material having high thermal conductivity relative to said semiconductor material to constitute said base member and said ring as heat sinks for said thick portions.

5. A semiconductor device including: a wafer of semiconductor material having an upper surface and a central concave portion and a peripheral planar portion, a planar lower surface, and at least one p-n junction disposed in said material between said upper and lower surfaces substantially over the extent of said wafer; a ring in electrical and mechanical connection to only said peripheral portion of said upper surface; and a metallic base member provided with an annular upper portion in electrical and mechanical connection to said lower surface at only a region disposed oppositely from said peripheral portion of said upper surface, said base member being composed of material having high thermal conductivity relative to said semiconductor material to constitute said base member a heat sink.

6. A semiconductor device including: a wafer of semiconductor material having an upper surface with a central concave portion and a peripheral planar portion, a planar lower surface, and at least one p-n junction disposed in said material between said upper and lower surfaces substantially over the extent of said wafer; a ring in electrical and mechanical connection to only said peripheral portion of said upper surface; and a metallic base member provided with an annular upper portion in electrical and mechanical connection to said lower surface at only a region thereof disposed oppositely from said peripheral portion of said upper surface, said base member and said ring being composed of material having high thermal conductivity relative to said semiconductor material to constitute said base member and said ring as heat sinks.

7. A semiconductor device including: a wafer of silicon semiconductor material having a thick portion, a relatively thin portion integral therewith, said thick and thin portions having a continuous upper surface and a continuous lower surface, and a diffused p-n junction disposed in said material substantially over the extent of said wafer at one of said surfaces; and first and second contact means in electrical and mechanical connection to only said thick portion at said upper and lower surfaces, respectively, at least one of said contact means having high thermal conductivity relative to said semiconductor material to constitute a heat sink for said thick portion.

8. A device in accordance with claim 7 in which said thin portion has a minimum thickness in the order of 0.001 inch.

9. A semiconductor device including: a wafer of silicon semiconductor material having a thick portion, a relatively thin portion integral therewith, said thick and thin portions having a continuous upper surface and a continuous lower surface, and first and second diffused p-n junctions disposed in said material substantially over the extent of said wafer at said upper and lower surfaces, respectively; and first and second contact means in electrical and mechanical connection to only said thick portion at said upper and lower surfaces, respectively, at least one of said contact means having high thermal conductivity relative to said silicon semiconductor material to constitute a heat sink for said thick portion.

10. A device in accordance with claim 9 wherein said thin portion has a minimum thickness in the order of 0.001 inch.

References Cited in the file of this patent

UNITED STATES PATENTS

| | | |
|---|---|---|
| 2,569,347 | Shockley | Sept. 25, 1951 |
| 2,790,037 | Shockley | Apr. 23, 1957 |

FOREIGN PATENTS

| | | |
|---|---|---|
| 705,280 | Great Britain | Mar. 10, 1954 |